(12) United States Patent
Veselov

(10) Patent No.: US 7,657,596 B2
(45) Date of Patent: Feb. 2, 2010

(54) DISTRIBUTED DATA SHARING METHODS AND SYSTEMS

(75) Inventor: Pavel S. Veselov, San Jose, CA (US)

(73) Assignee: Sun MIcrosystems, Inc., Santa Clara, CA (US)

( * ) Notice: Subject to any disclaimer, the term of this patent is extended or adjusted under 35 U.S.C. 154(b) by 1560 days.

(21) Appl. No.: 10/280,807

(22) Filed: Oct. 24, 2002

(65) Prior Publication Data

US 2004/0083264 A1    Apr. 29, 2004

(51) Int. Cl.
*G06F 15/16*    (2006.01)
(52) U.S. Cl. .................... 709/204; 709/203; 709/205
(58) Field of Classification Search .............. 709/204, 709/205, 203
See application file for complete search history.

(56) References Cited

U.S. PATENT DOCUMENTS 6,463,460 B1 * 10/2002 Simonoff .................... 709/203
6,501,463 B1 * 12/2002 Dahley et al. ............... 345/173
2003/0077561 A1 * 4/2003 Alsop et al. ................. 434/408
2003/0208534 A1 * 11/2003 Carmichael ................. 709/203

* cited by examiner

*Primary Examiner*—Ario Etienne
*Assistant Examiner*—Barbara N Burgess
(74) *Attorney, Agent, or Firm*—Martine Penilla & Gencarella, LLP

(57) ABSTRACT

A system, method, and computer implemented method for sharing data between networked applications is provided. The system includes at least a whiteboard space, a single server mode library, and a client mode library. The single server mode library provides access to the whiteboard space, where the access is to read or post data to the whiteboard space. The client mode library is provided for one or more processes. The client mode library is in networked communication with the single server mode library, and the client mode library is capable of managing one or more reader objects and one or more posting objects. The single server mode library is further capable of managing one or more reader objects and one or more posting objects.

12 Claims, 4 Drawing Sheets

DISTRIBUTED DATA SHARING METHODS AND SYSTEMS

COPYRIGHT AUTHORIZATION

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention relates generally to software systems, and more particularly, to methods and systems for implementation of distributed data sharing systems.

2. Description of the Related Art

There are various ways to make different applications, or threads within applications, communicate with each other in Java, other programming languages, and other sources. The approach is to call a method in an application, and within the parameters of the method provide the information to be communicated to that application. If two applications have different methods there might not be a common interface available for them to communicate through. For example, Java might use Remote Method Invocation (RMI) and C might use Cobra.

A typical way to distribute data or events to a series of applications is to set up a listener interface (LI). Applications that implement the LI and register within the associated event provider will get access to all of the listeners and posters registered on the LI. The event provider is capable of generating events. Either an application calls the event provider and asks the event provider to generate an event or the event provider itself generates the event. In addition, the event provider has to know where (i.e., to what application) to distribute the events using the information gathered during registration. In the registration process, the application generally needs to define its location, its interface compliance, and its interest to read certain events.

In another approach, listeners need not pre-register with an event provider. Instead of distributing an event, clients can write events to a managed data location. A client can then access and read the event data. Similar to the above described process, one common technique is to have the managed data location function as an event provider, thus requiring clients to register. When a client writes to the managed data location, and the managed data location is responsible for delivering the data to the registered clients. Another common technique is to require clients to check the managed data location for event data. Although sharing of events is possible using a number of techniques, as described above, the management and tracking of reading activity, posting activity, and access to events stored across different managed data locations is not sufficiently defined to support robust sharing of critical data.

In view of the foregoing, there is a need for methods, systems and computer program instructions for managing reading and posting activity of events to be shared between processes and/or applications communicating across a network.

SUMMARY OF THE INVENTION

Broadly speaking, the present invention fills these needs by providing systems and methods for sharing data among distributed applications.

In one embodiment, a method for managing shared data communication is disclosed. The method includes defining a whiteboard space and detecting a process request to post or read data to the whiteboard space. In response to the process request a server mode library is launched for accessing the whiteboard space. The method further includes detecting a next process request to post or read data to the whiteboard space, and in response to the next process request, a client mode library is launched. The client mode library is in communication with the server mode library to obtain access to the whiteboard space, and each new process requesting to post or read to the whiteboard space creates a client mode library. Each client mode library is in communication with a single one of the server mode library.

In another embodiment, a system for sharing data between networked applications is disclosed. The system includes at least a whiteboard space, a single server mode library, and a client mode library. The single server mode library provides access to the whiteboard space, where the access is to read or post data to the whiteboard space. The client mode library is provided for one or more processes. The client mode library is in networked communication with the single server mode library, and the client mode library is capable of managing one or more reader objects and one or more posting objects. The single server mode library is further capable of managing one or more reader objects and one or more posting objects.

In yet another embodiment, a computer readable media having program instructions for managing shared data communication is disclosed. The computer readable media includes program instructions for defining a whiteboard space and program instructions for detecting a process request to post or read data to the whiteboard space. In response to the process request, the media includes program instructions for launching a server mode library for accessing the whiteboard space. Program instructions for detecting a next process request to post or read data to the whiteboard space is further provided. In response to the next process request, the media includes program instructions for launching a client mode library. The client mode library is in communication with the server mode library to obtain access to the whiteboard space, and each new process requesting to post or read to the whiteboard space creates a client mode library and each client mode library is in communication with a single one of the server mode library.

Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE PREFERRED EMBODIMENTS

Figure 1:
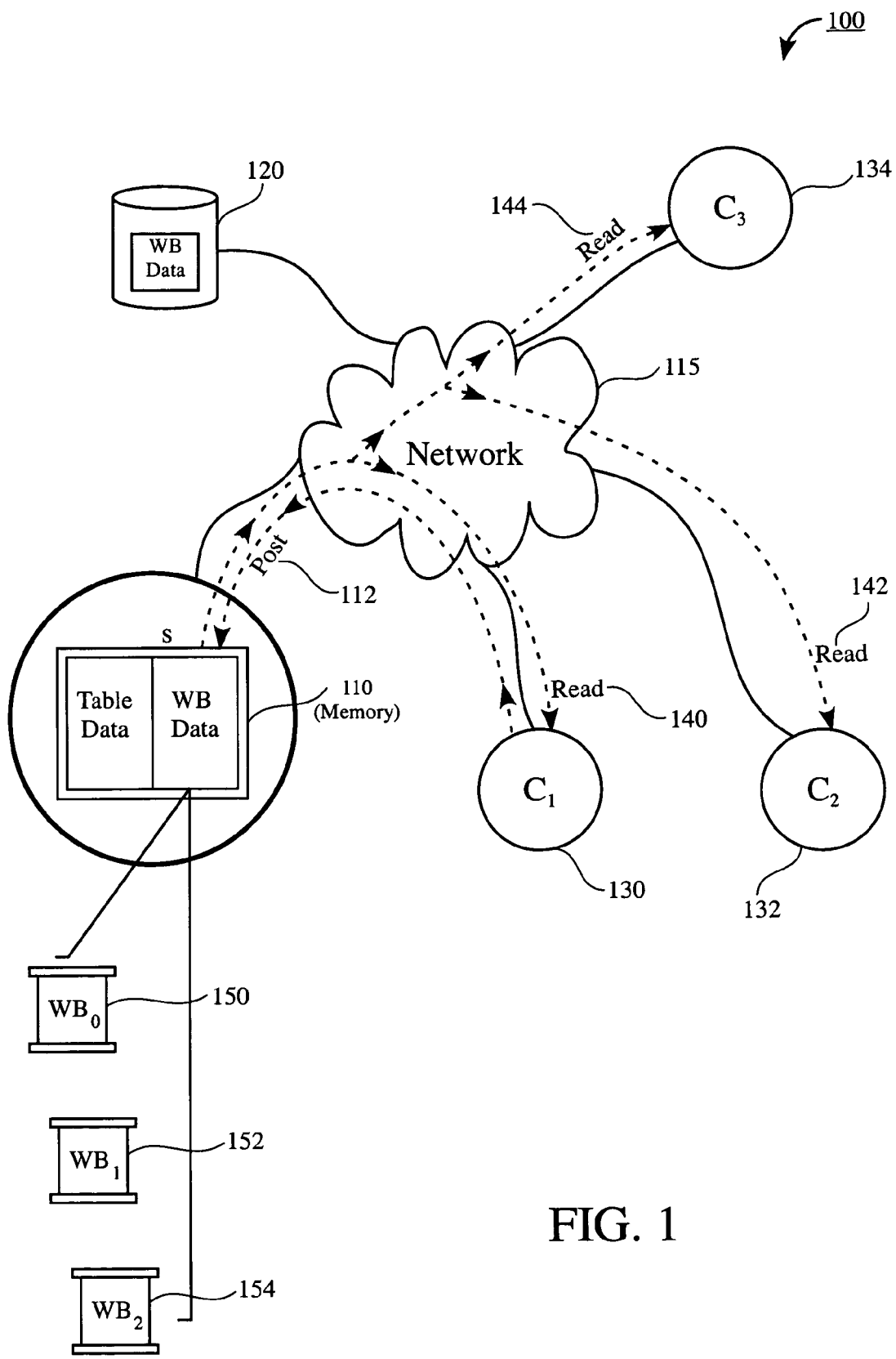
FIG. 1 is a block diagram illustrating a whiteboard system and client subscribers communicating across a network, in accordance with one embodiment of the present invention.

An invention is disclosed for distributed data sharing systems and methods. The data sharing systems could be, for example, whiteboard data sharing, Internet multi-user meeting data sharing, shared documents, a shared system development case, shared system events, log data monitoring, status monitoring, etc. Embodiments of the present invention allow processes to post and read messages in a data sharing system. The embodiments of the present invention therefore enable the management of data on a whiteboard system amongst various users, who communicate across a network connection or connections. As used herein, the term "whiteboard" is broadly defined to mean a space that can hold data (e.g., storage), and that data can be posted to the space and read from the space. In a networked environment, the storage can be local to a particular computer system, can be distributed among systems, or located on a network (e.g., whiteboard data 120 of FIG. 1).

Each user, as will be described below, will implement a server mode library or a client mode library to enable and facilitate management of the communication. Broadly speaking, the system will require the first process to implement the server mode library and then all other processes will implement a thin client, i.e., a client mode library.

As used herein, the terms "library" and "library mode" are generally defined as a collection of subroutines and functions, and are used to link programs together. Preferably, libraries are stored in one or more files and are in a compiled format. A library defines a way of organizing the reusability of code. Still further, libraries can be supplied by an operating system or software environment developer, and can be used with many different programs. Furthermore, routines in a library may be general purpose or designed for some specific function such as, for example, three dimensional animated graphics, etc. In addition, libraries can be linked with programs to form a complete executable. This linking may be static linking or, in some systems, dynamic linking.

In operation, each client mode library will communicate with the single server mode library. In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to unnecessarily obscure the present invention.

As embodiments of the present invention can implement Java technology, a brief introduction to Java is provided below. Nevertheless, this brief introduction to Java should not be considered as limiting as Java technology is well known by those skilled in the art. An overview of Java is provided below. Java is a programming language. In operation, a user of a typical Java based system interacts with an application layer of a system generally written by a third party developer. The application layer generally provides the user interface for the system. A Java module is used to process commands received by the application layer. A Java virtual machine is used as an interpreter to provide portability to Java applications. In general, developers design Java applications as hardware independent software modules, which are executed Java virtual machines. The Java virtual machine layer is developed to operate in conjunction with the native operating system of a particular hardware, which represents the physical hardware on which the system operates or runs. In this manner, Java applications can be ported from one hardware device to another without requiring updating of the application code.

Unlike most programming languages, in which a program is compiled into machine-dependent, executable program code, Java classes are compiled into machine independent byte code class files which are executed by a machine-dependent virtual machine. The virtual machine provides a level of abstraction between the machine independence of the byte code classes and the machine-dependent instruction set of the underlying computer hardware. A class loader is responsible for loading the byte code class files as needed, and an interpreter or just-in-time compiler provides for the transformation of byte codes into machine code.

More specifically, Java is a programming language designed to generate applications that can run on all hardware platforms, small, medium, and large, without modification. Developed by Sun, Java has been promoted and geared heavily for the Web, both for public Web sites and intranets. Generally, Java programs can be called from within HTML documents or launched standalone. When a Java program runs from a Web page, it is called a "Java applet," and when run on a Web server, the application is called a "servlet."

Java is an interpreted language. The source code of a Java program is compiled into an intermediate language called "byte code." The byte code is then converted (interpreted) into machine code at runtime. Upon finding a Java applet, the Web browser invokes a Java interpreter (Java Virtual Machine), which translates the byte code into machine code and runs it. Thus, Java programs are not dependent on any specific hardware and will run in any computer with the Java Virtual Machine software. On the server side, Java programs can also be compiled into machine language for faster performance. However a compiled Java program loses hardware independence as a result.

As used herein, a whiteboard approach is generically a way of posting and reading data from a virtual entity, or storage location. This term should be differentiated from conventional whiteboards that use dry-erase pens and are used in meeting rooms and the like. Embodiments of this invention can be implemented using a messaging system that supports named destinations, which may be bound by a client. Example messaging systems include, for example, a Java messaging system implementation, a User Datagram Protocol (UDP) system that uses broadcast technology, etc. In one embodiment, the invention can work over multiple processes, TCP/IP hosts, and other communication protocols.

Keeping this brief overview of Java and software as it relates to the embodiments of the present invention in mind, reference is now made to FIG. 1. As shown, system 100 includes a single server 110 and multiple clients 130, 132, and 134, all connected over a network 115. As mentioned above, the server is a server mode library and the clients are client mode libraries that are executed in a particular process. The server 110 includes whiteboard (WB) data and table data. Whiteboard data 120 can be stored at a remote location from the server. In one embodiment, a system has only one server that has access to all of the information about active whiteboards, receives all postings to whiteboards and distributes those postings to whiteboard readers upon request. The server can support multiple whiteboards; each having a unique name. Clients that want to either post to a whiteboard or read from a whiteboard will first identify which whiteboard they want to access.

For example, there can be data for Whiteboard$_0$ (WB$_0$) 150, Whiteboard$_1$ (WB$_1$) 152, Whiteboard$_2$ (WB$_2$) 154, and so on. As shown, the system has clients that communicate across the network 115 to the server 110. Three clients; C$_1$ 130, C$_2$ 132, and C$_3$ 134 are shown. These clients can read data from a whiteboard as well as post data to a whiteboard. Generally, any library can be designated as the server, but only one server can be designated for a system. C$_1$ 130 is shown reading 140 data from a whiteboard, which is delivered by the server 110 across the network 115. C$_1$ 130 is also posting 112 data to a whiteboard, which is received by the server 110 across the network 115. C$_2$ 132 is reading 142 data from a whiteboard, which is delivered by the server 110 across the network 115. Finally, C$_3$ 132 is reading 144 data from a whiteboard, which is delivered by the server 110 across the network 115.

Figure 2:
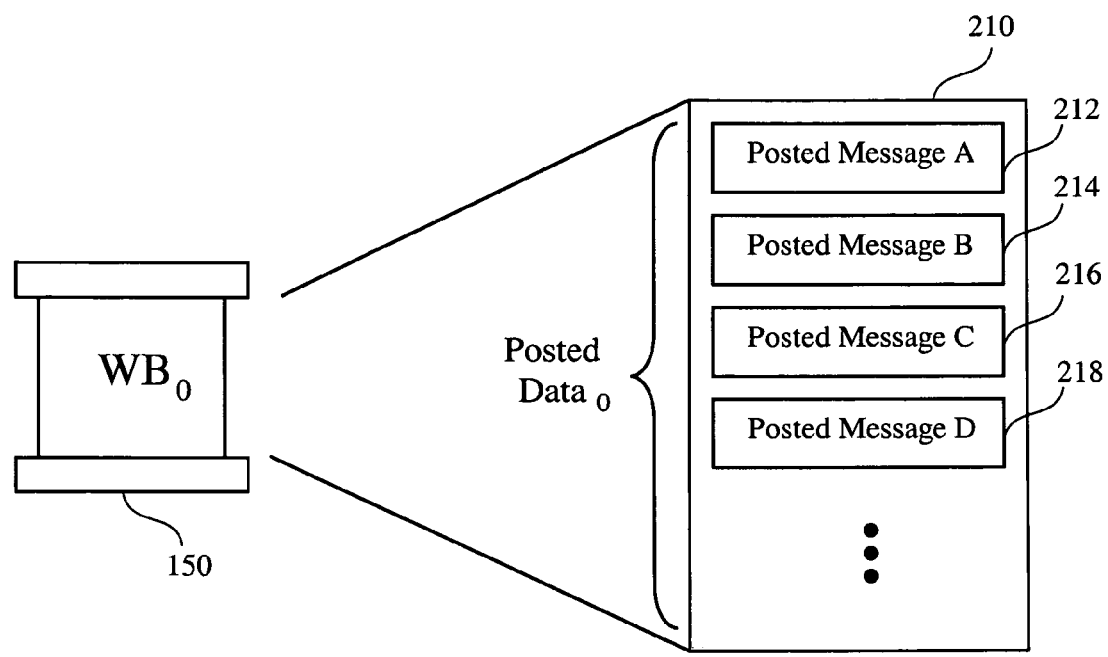
FIG. 2 is a block diagram illustrating a whiteboard and a series of associated posted messages, in accordance with one embodiment of the present invention.

Reference is now made to FIG. 2 illustrating a whiteboard and a series of associated posted messages, in accordance with one embodiment of the present invention. Whiteboard$_0$, WB$_0$ 150 is shown with its contents in an exploded view. WB$_0$ 150 contains posted data$_0$ 210, which is made up of posted messages. A column of posted messages is shown. The first entry in the posted data$_0$ table 210 is posted message A 212, the second entry is posted message B 214, the third entry is posted message C 216, the fourth entry is posted message D 216, the fifth entry is posted message D 218, and so on. The posted messages shown could have been posted by, for example, clients or the server shown in FIG. 1. These messages could likewise be read by clients or the server, as shown in FIG. 1.

Figure 3:
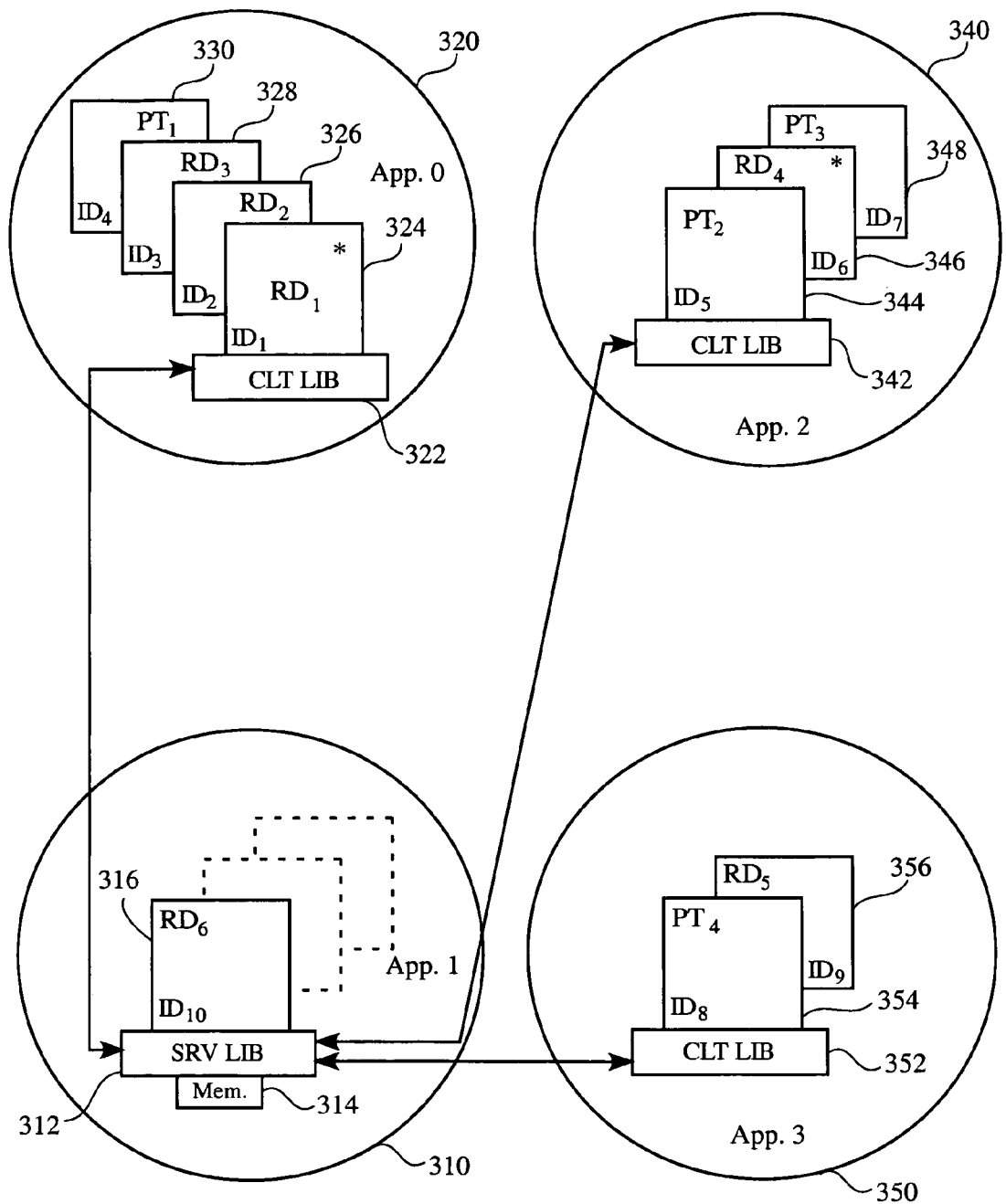
FIG. 3 is a block diagram illustrating four applications in communication between library modes, in accordance with one embodiment of the present invention.

Reference is made to a block diagram depicted in FIG. 3 illustrating four applications in communication across a server library, in accordance with one embodiment of the present invention. As was seen in FIG. 1, messages can be posted from clients or the server to whiteboards as well as read from whiteboards by clients or the server. FIG. 3 shows clients residing in different applications. Broadly speaking, an application is defined as a process. To illustrate intercommunication between a server library and client libraries, several applications are shown processing read and post operations. As shown, applications 310, 320, 340, and 350 are operating using one server mode library and a number of client mode libraries. The first library to launch will become the server mode library, and all others will default to client mode libraries.

As mentioned above, only one server mode library will be active and none or a plurality of client mode libraries can be active. The libraries, will manage communication to enable posting of data to a particular whiteboard and reading of data from a particular whiteboard. As illustrated, reader objects are designated as RD and poster objects are designated as PT. In a particular system, a library (i.e., either server or client) can support one or more reader objects (RDs) and one or more poster objects PTs). However, each reader object will connect to a single whiteboard and a poster object will also connect to a single whiteboard. In certain circumstances, multiple reader objects can connect through a single library, as is illustrated in application 320, and multiple poster objects can connect through a single library, as illustrated in application340. Further yet, more than one reader object can connect to the same whiteboard, as can be the case in application 320. In one embodiment, the several reader objects can also connect to different whiteboards.

The first application, App 1 310 contains a server library 312, which resides in memory 314 of App 1, 310. The server library can also act as does the client, thus enabling reads and posts to whiteboards. For example, App 1 310 is shown with a reader, RD$_6$ 316 having a reader object identifier, ID$_{10}$. An object identifier identifies a reader object. In one embodiment, the respective client library assigns an object identifier for each reader, which will be unique for each reader object.

In one embodiment, the whiteboard reader object is associated with a whiteboard. In this manner, the client knows which object (i.e., reader or poster) is associated with a particular whiteboard. Thus, the client will periodically poll the server for each active reader object (or poster object), thus telling the server that there are readers (or posters) located on that client's library that are requesting data (or sending data, in the case of posters) from whiteboards. Further illustration will be provided in FIG. 5 below.

Now moving to describing Application 0 320. Application 0, 320 acts as a client and has a client library 322. Application 0 322 contains readers and a poster. The first reader of Application 0 322 is reader one, RD$_1$ 324, having an object identifier 1, ID$_1$. The second reader of Application 0 320 is reader 2, RD$_2$ 326 having an object identifier 2, ID$_2$. The third reader of Application 0 320 is reader 3, RD$_3$ 328 having an object identifier 3, ID$_3$. The first poster of Application 0 320 is poster 1, PT$_1$ 330 having an object identifier 4, ID$_4$. Posters have unique object identifiers as was described with reference to readers. The client library of Application 0 320 communicates to the server library of Application 1 so that the readers and posters of Application 0 320 access a whiteboard (not shown). As mentioned above, access can be to any one of a plurality of whiteboards. Clients that want to either post to a whiteboard or read from a whiteboard will first identify which whiteboard they want to communicate with.

Now moving to Application 2. Application 2 340 is shown with posters and a reader. Application 2 340 acts as a client and contains a client library 342. Application 2 340 contains posters and a reader. The first poster of application 2 340 is poster 2, PT$_2$ 344, having the object identifier 5, ID$_5$. The first reader of Application 2 340 is reader 4, RD$_4$346 having an object identifier 6, ID$_6$. The second poster of application 2 340 is poster 3, PT$_3$348, having an object identifier 7, ID$_7$. The client library of Application 2 340 communicates to the server library of application $_1$ so that the readers and posters of Application 2 340 can obtain access to a whiteboard (not shown).

Now moving to Application 3. Application 3 350 is shown with a poster and a reader. Application 3 350 acts as a client and contains a client library 352. The poster of application 3 350 is poster 4, PT$_4$ 354, having an object identifier 8, ID$_8$. The reader of application 3 350 is reader 5, RD$_5$ 356 having an object identifier 9, ID$_9$. The client library of Application$_3$, 350 communicates to the server library of Application 1 310 so that the readers and posters of application 3 can obtain access to a whiteboard (not shown).

Figure 4:
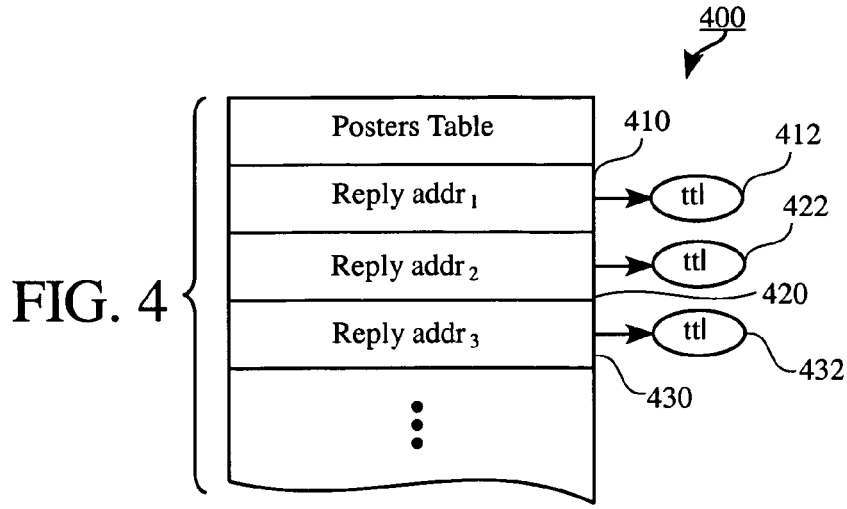
FIG. 4 is a block diagram showing a poster table, in accordance with one embodiment of the present invention.

FIG. 4 is a block diagram showing a poster table 400, in accordance with one embodiment of the present invention. The poster table 400 contains reply addresses and helps in the management of poster activities. The first reply address is reply address 1 410. The second reply address is reply address 2 420. The third reply address is reply address 1 430.

When a client creates a new poster object, the client library defines the poster object to be associated with the whiteboard the poster wants to access (i.e., post). The poster object is registered at the time of creation and is assigned the unique object identifier (such as $ID_4$ in FIG. 3), and it will be used to post data to the whiteboard. No communication to the server is necessary at the point of initial registration.

In one embodiment, each reply address has an associated time to live (ttl). The ttl for reply address 1 410 is ttl 412. The ttl for reply address 2 420 is ttl 422. The ttl for reply address 3 430 is ttl 432. The ttl values are defined for whiteboard reader and poster objects. In one example, the ttl values are initially assigned with default values. The values may differ due to a configuration or certain requirements for a system. Each time an object is accessed, for example by a watcher thread, the ttl is reduced by the amount of time units that have passed since the last check. When the ttl is 0 or less, the object is counted as dead and is removed from the corresponding table, i.e., its time to live is over and the ttl has expired. This activity will help remove objects (e.g., a reply address) that corresponds to a client that has not sent any data in a certain period of time and is counted as down. Active clients are, in one embodiment, required to periodically poll the server. Thus, active clients should not have their ttl expired. In one embodiment, the poll interval should be a maximum ttl minus maximum network latency.

Figure 5:
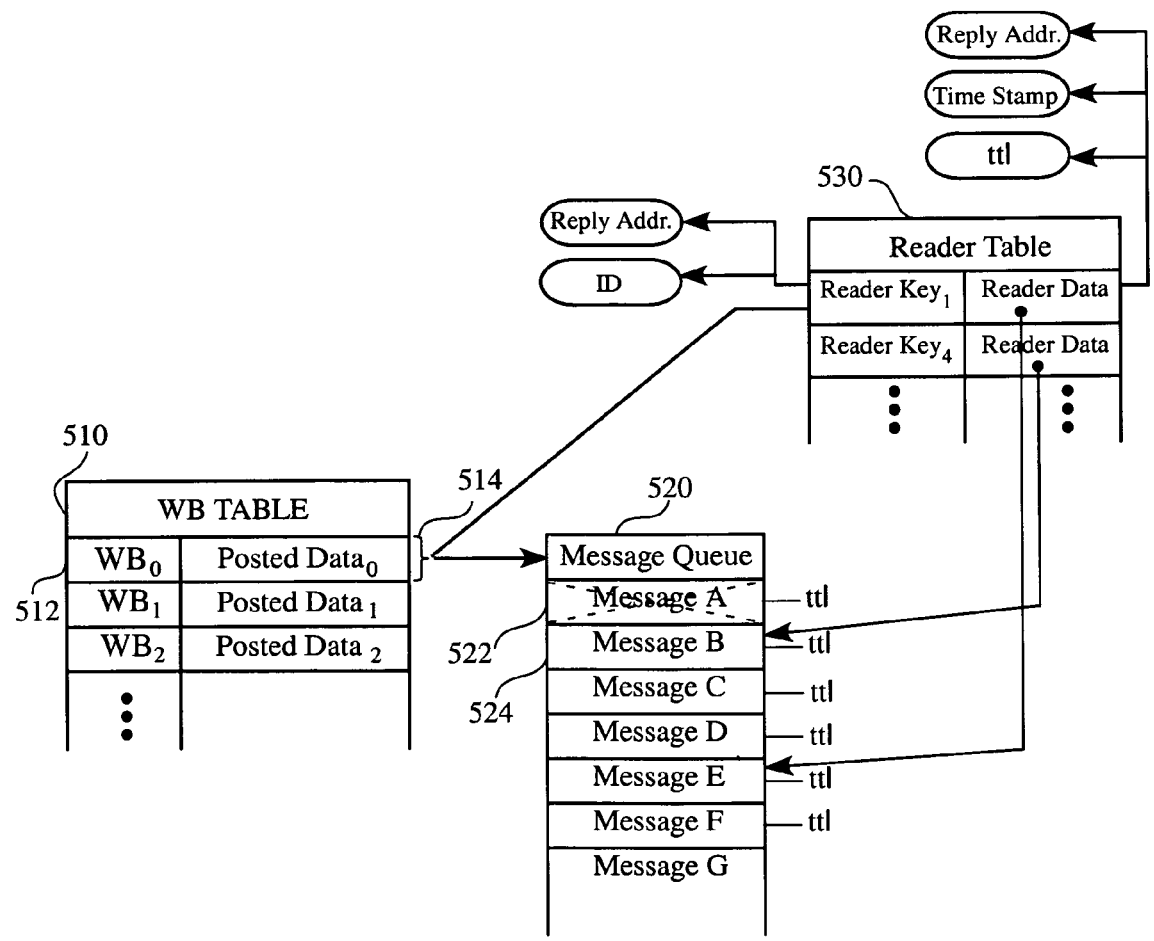
FIG. 5 is a block diagram showing a whiteboard table and an associated message queue and a reader table, in accordance with one embodiment of the present invention.

FIG. 5 is a block diagram showing a whiteboard table, an associated message queue, and reader table, in accordance with one embodiment of the present invention. FIG. 5 shows a reader table 530, a whiteboard table 510, and a message queue 520. Each row of the whiteboard table 510 tracks a whiteboard and its associated posted data. For example the first row contains an entry for whiteboard$_0$ and its associated data, posted data$_0$ 514. The second row contains WB$_1$ and its associated data posted data$_1$. The third row contains WB$_2$ and its associated data posted data$_2$. The table could continue with more entries, which are not shown. Each Posted data entry has an associated message queue. Posted data$_0$ has the associated message queue 520. The message queue 520 has a series of messages. The first message is message A 522, the second message is message B 524, and so on. Each message has an associated ttl. When the ttl of a given message has reached zero the message expires and is no longer available on the message queue. Implementing a ttl for each message assists in preventing a message queue from overgrowing with aged data. Another approach for controlling the message queue would be to set a limit on the size of the queue, thus removing the oldest messages when the queue reaches this maximum queue size and new messages arrive.

The reader table 530 tracks the activities of the readers. Each row of the reader table has a reader key and reader data. Each reader data entry has an associated reply address, time stamp and ttl. Each reader key has an associated reply address and reader object identifier (Id). In one embodiment, the reader object is associated with a particular whiteboard.

In operation, a reader sends a request to the server through the client (not shown in FIG. 5) to read data from whiteboard 0. The request consists of the name of the whiteboard that the reader wants to read from and certain pertinent information about the reader object such as the reader object identifier, the reply address, the ttl, and the timestamp. This information is tracked in the reader table 530. The reply address is an implementation specific address. With the reply address the server will know to which physical location to deliver the data, i.e., where the client that requested the data resides. The server will then retrieve the requested data from the subject whiteboard.

Reading will start at a message in the message queue 520 after the last read message. For instance, in FIG. 5, the reader associated with Reader Key 1 points to Message E. Thus, the reader associated with Reader Key 1 last read Message E, and therefore, the next message to be read will be Message F. In the same manner, the Reader associated with Reader Key 4 last read Message B, and thus, the next message it will read will be Message C. Following this example, if a new reader that never previously read from whiteboard 0 were to come up and be tracked in the reader table 530, the pointer would be set just before Message A. In this manner, the first message read by the new reader would be Message A. Alternatively, if Message A had expired due to the ttl (as illustrated with the dashed cross-out), then the pointer would be set just before Message B. In this case, the first message read by the new reader would be Message B and so on. When the data is read, the data is returned to the reply address location.

The library timestamp is a timestamp of when a library was created or initialized. A library timestamp is useful since sometimes the reply address and reader object identifier may be the same, if a library has been restarted. So, to more uniquely identify the library, the timestamp at the time of the library creation is used. The timestamp sent with the request is compared to the timestamp the reader has at the reply address. If the timestamp from the original request does not match the timestamp of the reader object currently at the reply address then the original library located at this reply address is no longer present and a new library is residing at the reply address, in which case the reader object is discarded and a new reader object is created. The ttl of the reader object will also be checked by the server, if the ttl has gone to zero or less, then the reader has expired and the request for data will not be completed.

After a correct reader object is either found or created, and the ttl is confirmed to not have expired, the server will determine what new messages are in the queue since the last time the reader polled the server for data delivery. As mentioned above, if a new reader object was created the pointer will pick up starting at the beginning of the queue, at message A 522, however if message A's associated ttl had expired, the message would have been deleted.

Referring again to posting operations, when a poster wants to post data to a whiteboard, the following message is sent by the client library to the server library:

command name, post
whiteboard name
reply address
message data

This message communicates to the server library to add message data to a certain named whiteboard. A poster corresponding to the reply address is located in the poster table 400 (as shown in FIG. 4). Then the reply address' ttl value is reset to the default. If there is no poster object yet in the table, a poster object is created. Now, the whiteboard data is located with the whiteboard name from the whiteboard table 510 (as shown in FIG. 5). The data is added as the last message (e.g., Message G) of the message queue 520 associated with that whiteboard 512.

Regarding when data might be read, a client library with active reader objects will periodically poll the server. The client library will communicate to the server that the client library has readers that are requesting data from a whiteboard. The message sent by the client to the server during polling would consist of the following information:

command name, query
whiteboard name
reply address
reader object identifier
library timestamp Then the client library would receive a message from the server library that contains data from the subject whiteboard:
    command name, deliver
    query timestamp
    whiteboard name
    reader object identifier
    message data The query timestamp will be the timestamp sent with the original poll and will be compared to the timestamp at the current client library delivery location. The comparison will be made to determine if the same client library still resides at the delivery location, i.e., the client library which sent out the initial poll. Then the delivery operations proceed as described above.

Clients have the capability of managing resident readers and posters. For example, clients have the capability of closing reader objects indicating that they are no longer needed. When a client library wants to close a reader object the client library sends the following message to the server library:
    command name, delete
    whiteboard name
    reply address
    reader object identifier The reader object is then removed from the client library, and the client library will no longer receive data for that particular reader.

A client can likewise close poster objects indicating that they are no longer needed. To invalidate a poster object a client library sends the following message to the server library:
    command name, delete
    reply address The poster is then removed from the client library and the client will no longer send data from that poster.

A client can delete reader object or poster object information from the respective corresponding tables, i.e., the reader table 530 (as shown in FIG. 5) or the poster table 400 (as shown in FIG. 4). The client library sends out the following message to the server:
    command name, delete
    whiteboard name
    reply address
    reader object identifier The server library then attempts to remove a reader object's data from the Readers table. If data is found in the reader table 530 that corresponds to the whiteboard name and reader object identifier in the message, then the reader data is deleted. If no data corresponding to the whiteboard name and reader object is found, then the server will go to the poster table 400. Then the server library will delete the reply address corresponding to the reply address in the message from the poster table 400.

To provide for problems with server libraries, the server library has a fault tolerance capability. If something happens to the server, like a crash, an unexpected shutdown, etc., the fault tolerance features defined herein provide a way of transferring the server's contents to a client library, which then will become the new server library. For example, when the server library begins to shutdown, the server library will send out a distress message. An example of the message sent out is as follows:
    command name, host transfer
    system data This message is sent to the address of the first client library, found from the server library's current system data. Once the message is received by another client library, this client library will become the new server library. The new server library will copy all of the system data from the old server library and then bind to the destination that all other libraries recognized as the server library destination. Thus the normal execution of the system can continue with the new server library taking over for the original server library.

If data loss were to occur, potential data loss would be limited only to messages (in message queues) that were posted to whiteboards during the period of transitioning the system data. The readers and posters will not be impacted otherwise by the original server library's termination. In one embodiment, the transfer of data is possible provided the server library experiences a graceful shutdown, allowing the necessary time for the distress message to be sent out and the data transfer to be completed. The time needed to gracefully shutdown will vary depending on the application and system.

Although operations have been described in a particular order, it should be understood that the order of execution might differ. In one example, the order of execution may proceed in parallel or serially depending on the specific algorithm and hardware implementation. In another example, the order of the functional operations may be rearranged.

Further, the above described invention has been described in the general context of data (or event) sharing through a whiteboard system, which is in communication with a series of applications. It will be apparent to those skilled in the art that the series of applications desiring access to the whiteboard system may be operating in a distributed fashion across a network. Further, it should be appreciated that the invention may be implemented with other routines, programs, components, data structures, etc., which perform particular tasks or implement particular abstract data types. Furthermore, the invention may be practiced with other computer system configurations including hand-held devices, microprocessor systems, microprocessor-based or programmable consumer electronics, minicomputers, mainframe computers and the like.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for managing shared data communication, comprising:

defining a whiteboard space;

detecting a process request to post or read data to the whiteboard space by a first process, and in response to the process request, launching a server mode library for accessing the whiteboard space;

detecting a next process request to post or read data to the whiteboard space by a next process, and in response to the next process request, launching a client mode library, the client mode library being in communication with the server mode library to obtain access to the whiteboard space, wherein each new process requesting to post or read to the whiteboard space creates a client mode library and each client mode library is in communication with a single one of the server mode library.

2. A method for managing shared data communication as recited in claim 1, wherein each process can be associated with one or more read objects for enabling read communication with the whiteboard space, and each process can be associated with one or more post objects for enabling posting communication to the whiteboard space.

3. A method for managing shared data communication as recited in claim 2, wherein read objects and post objects are associated with the whiteboard space.

4. A method for managing shared data communication as recited in claim 1, wherein each process is an application.

5. A method for managing shared data communication as recited in claim 2, wherein each read object and each post object is designated with a unique object identifier.

6. A method for managing shared data communication as recited in claim 1, wherein the server mode library maintains a poster table identifying posters to the whiteboard space and a reply address of the client mode library of the poster.

7. A method for managing shared data communication as recited in claim 1, wherein the server mode library maintains a whiteboard table for tracking active whiteboard spaces, the whiteboard space being tracked in the whiteboard table.

8. A method for managing shared data communication as recited in claim 1, wherein the whiteboard space maintains a message queue of messages posted to the whiteboard space, each message in the message queue being associated with a time to live (ttl) marker.

9. A method for managing shared data communication as recited in claim 8, further including a reader table, the reader table being implemented to track readers accessing data posted on the whiteboard space.

10. A method for managing shared data communication as recited in claim 1, wherein the whiteboard space identifies storage for data being posted and for holding the data being read.

11. Computer readable media having program instructions for managing shared data communication, the computer readable media comprising:

program instructions for defining a whiteboard space;

program instructions for detecting a process request to post or read data to the whiteboard space by a first process, and in response to the process request, program instructions for launching a server mode library for accessing the whiteboard space;

program instructions for detecting a next process request to post or read data to the whiteboard space by a next process, and in response to the next process request, program instructions for launching a client mode library, the client mode library being in communication with the server mode library to obtain access to the whiteboard space, wherein each new process requesting to post or read to the whiteboard space creates a client mode library and each client mode library is in communication with a single one of the server mode library.

12. Computer readable media having program instructions for managing shared data communication as recited in claim 11, wherein each process can be associated with one or more read objects for enabling read communication with the whiteboard space, and each process can be associated with one or more post objects for enabling posting communication to the whiteboard space.

* * * * *